(12) United States Patent
Pochop, Jr.

(10) Patent No.: US 8,913,959 B1
(45) Date of Patent: Dec. 16, 2014

(54) METHOD AND APPARATUS FOR FACILITATING WIRELESS ACCESS POINT REGISTRATION

(71) Applicant: Juniper Networks, Inc., Sunnyvale, CA (US)

(72) Inventor: Jeffrey L. Pochop, Jr., Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/630,406

(22) Filed: Sep. 28, 2012

(51) Int. Cl.
*H04W 88/02* (2009.01)

(52) U.S. Cl.
USPC ........................................ 455/41.2

(58) Field of Classification Search
USPC ............................... 455/41.2, 435.1; 370/338
See application file for complete search history.

(56) References Cited

U.S. PATENT DOCUMENTS

2011/0244798 A1* 10/2011 Daigle et al. ................. 455/41.2
2014/0031067 A1* 1/2014 Kubo et al. ................. 455/456.3

* cited by examiner

*Primary Examiner* — Diane Mizrahi
(74) *Attorney, Agent, or Firm* — Cooley LLP (57) ABSTRACT

In some embodiments a method comprises receiving, via a mobile device, registration data for a wireless access point. The method also comprises collection of location information of the mobile device and defining the wireless access point location based on location information of the mobile device. The method further comprises sending an electronic message including the registration data and the wireless access point location information to a provision device such that the provision device provisions the wireless access point.

22 Claims, 4 Drawing Sheets

METHOD AND APPARATUS FOR FACILITATING WIRELESS ACCESS POINT REGISTRATION

BACKGROUND

Some embodiments described herein relate generally to wireless access point provisioning systems, and more particularly, to methods and apparatus for facilitating wireless access point registration.

Wireless networks have become commonplace in office buildings, airports, hotels, shopping malls and homes. A typical wireless network includes one or more wireless access points that serve as gateways between wired and wireless networks and provide network access to users within their transmission range. Because wireless access points have specific transmission ranges, to increase connectivity among the wireless network users, the wireless access points are distributed over the coverage area. Furthermore, because each wireless access point has a finite bandwidth that is shared among its users, the placement and number of wireless access points is typically governed based on the physical area that is to be covered and the distribution of users in that area.

For a typical wireless access point, however, to be recognized by a wireless network and be able to connect to the wireless network, the wireless access point is registered at the wireless network. The wireless network uses accurate location information, specifically in dense urban areas, for registering the wireless access point. Wireless access point location information, however, is typically manually entered into the wireless network system, for example, by marking the location on a map, by manually entering location information into a computer system using an address entry script, etc.

A need exists, therefore, for methods and apparatus for facilitating wireless access point registration.

SUMMARY

In some embodiments a method comprises receiving, via a mobile device, registration data for a wireless access point. The method also comprises collecting location information of the mobile device and defining the wireless access point location information based on location information of the mobile device. The method further comprises sending an electronic message including the registration data and the wireless access point location information to a provision device such that the provision device provisions the wireless access point.

DETAILED DESCRIPTION

A wireless network is typically built from a collection of various devices connected to the wireless network via one or more wireless access points. Wireless access points (WAPs) serve as gateways between wired and wireless networks and provide network access to users within their transmission range.

Enterprises such as, for example, businesses, companies, stores, schools, households and building managers can install and use their own wireless access points to provide network access to their employees, customers, residents, students, family members, etc. A typical enterprise (e.g., a corporation, school, etc.) may attach several wireless access points to a wired network and provide wireless access to a local area network within the enterprise's locations (e.g., offices, classrooms, project sites, etc.) Furthermore, commercial network providers can install wireless access points in various locations throughout an area to provide coverage to users within that area. A common public application of wireless access points, typically referred to as hotspots, allow wireless clients to connect to the Internet without regard for the particular networks to which the wireless clients have attached. The concept has become common in large cities, where a combination of coffeehouses, libraries, as well as privately owned open wireless access points, allow clients to stay more or less continuously connected to the Internet, while moving around. In addition, wireless access points are commonly used in home wireless networks. Home networks generally have only one wireless access point to connect all the computers in a home. Most wireless access points are wireless routers, meaning converged devices that include the wireless access point, a router, and, often, an Ethernet switch. Many also include a broadband modem.

The wireless access points are typically managed by a control system that handles automatic adjustments to radio frequency power, channels, authentication, security, etc. For the control system to recognize a wireless access point; however, the wireless access point is first registered at the wireless network. The process of registration, configuration, and activation of wireless access points and preparation of networks to recognize wireless access points and use the wireless access points for providing services to the users is referred to as wireless access point provisioning. A wireless access point provision device (also referred to as a compute device) uses various information associated with a wireless access point including, physical location; serial number; Media Access Control (MAC) address, a unique identifier assigned to a wireless access point for communications on a physical network segment; RSA encryption key; etc., to register and configure the wireless access point at a network. Wireless access point information (also referred to as registration data), however, is typically manually entered into the wireless network system, for example, location information is entered by marking the location on an online map, entering location information into a computer system using an address entry script, etc.

The information associated with wireless access points is registered into the control system for the wireless access point to be used as part of the wireless network. For example, wireless access point location and Radio Frequency (RF) spectrum analysis are some of the key services that depend on registration of wireless access point installation location. RF spectrum analysis includes analysis of data related to RF spectrum activity derived from advanced interference identification algorithms. The results of this analysis can provide visibility into use of the shared RF spectrum by network users by providing information such as, for example, user device type, device location, impact of the device on the wireless network, etc.

In known wireless access point installations, the wireless access point information such as location, serial number, the unique identifier, etc. is, typically, recorded manually. For example, the wireless access point location can be recorded against a map or a floor plan. In some instances, barcode readers are used for reading and recording wireless access point information such as serial numbers or unique identifiers. The collected wireless access point information is entered into a database associated with the control system. Because manual processes are time consuming and error prone, automated registration of wireless access points where the wireless access point location information can be automatically recorded is desired.

Methods, apparatus, and non-transitory processor-readable medium are described herein for facilitating wireless access point registration by using a mobile device located in the vicinity of the wireless access point. The mobile device location is used as the location of the wireless access point and other information associated with the wireless access point such as serial number, unique identifier, etc., is entered via the mobile device. In other words, the automatically detectable location information of other devices (e.g., mobile devices) located in the vicinity of a wireless access point can be used as the location information of the wireless access point, for wireless access point registration. In some embodiments, a method includes receiving, via a mobile device, registration data for a wireless access point. The method further includes defining a wireless access point location based on location information of the mobile device. The method also includes sending, to a provision device, an electronic message including (1) the registration data, and (2) the wireless access point location information such that the provision device provisions the wireless access point.

In some embodiments, a non-transitory processor-readable medium stores code representing instructions to be executed by a processor, where the code includes code to receive a command to capture registration data of a wireless access point. The code further includes code to store, in response to the command, location information indicative of a location of a mobile device. The code also includes code to send, to a compute device, a message that (1) includes the registration data of the wireless access point, and (2) associates the location information of the mobile device with the wireless access point. The message is configured to prompt the compute device to provision the wireless access point such that the wireless access point can provide access to a network.

In some embodiments, an apparatus includes an access point registration module configured to be operatively coupled to a (1) a registration data reader, (2) a location tracking module, and (3) wireless transmission module. The access point registration module is configured to receive registration data of a wireless access point from the registration data reader. The access point registration module is further configured to request location information of a mobile device from the location tracking module in response to receiving the registration data. The access point registration module is also configured to send a message, via the wireless transmission module to a provision device, such that the wireless access point is provisioned by the provision device based on the registration data of the wireless access point and the location information of the mobile device.

In some embodiments, location information of a wireless access point can be scanned using a scanning device to automate wireless access point installation registration into a database associated with a control system, referred to, herein, as a wireless access point management infrastructure. For example, a custom module (e.g., a software application stored in memory and/or operating on a processor, or a hardware component) can be installed on a mobile device (e.g., a standard Smartphone) as a scanning device.

As used herein a wireless access point can be a Wireless Local Area Network (WLAN) wireless access point, or any fixed installed equipment such as, for example, an Ethernet switch, a web camera, an ID badge readers, etc.

As used herein, the singular forms "a," "an" and "the" include plural referents unless the context clearly dictates otherwise. Thus, for example, the term "a "wireless access point" is intended to mean a single wireless access point or a combination of wireless access points (e.g., wireless access points associated with a series of clients, wireless access point management infrastructures, provision devices, etc.).

Figure 1:
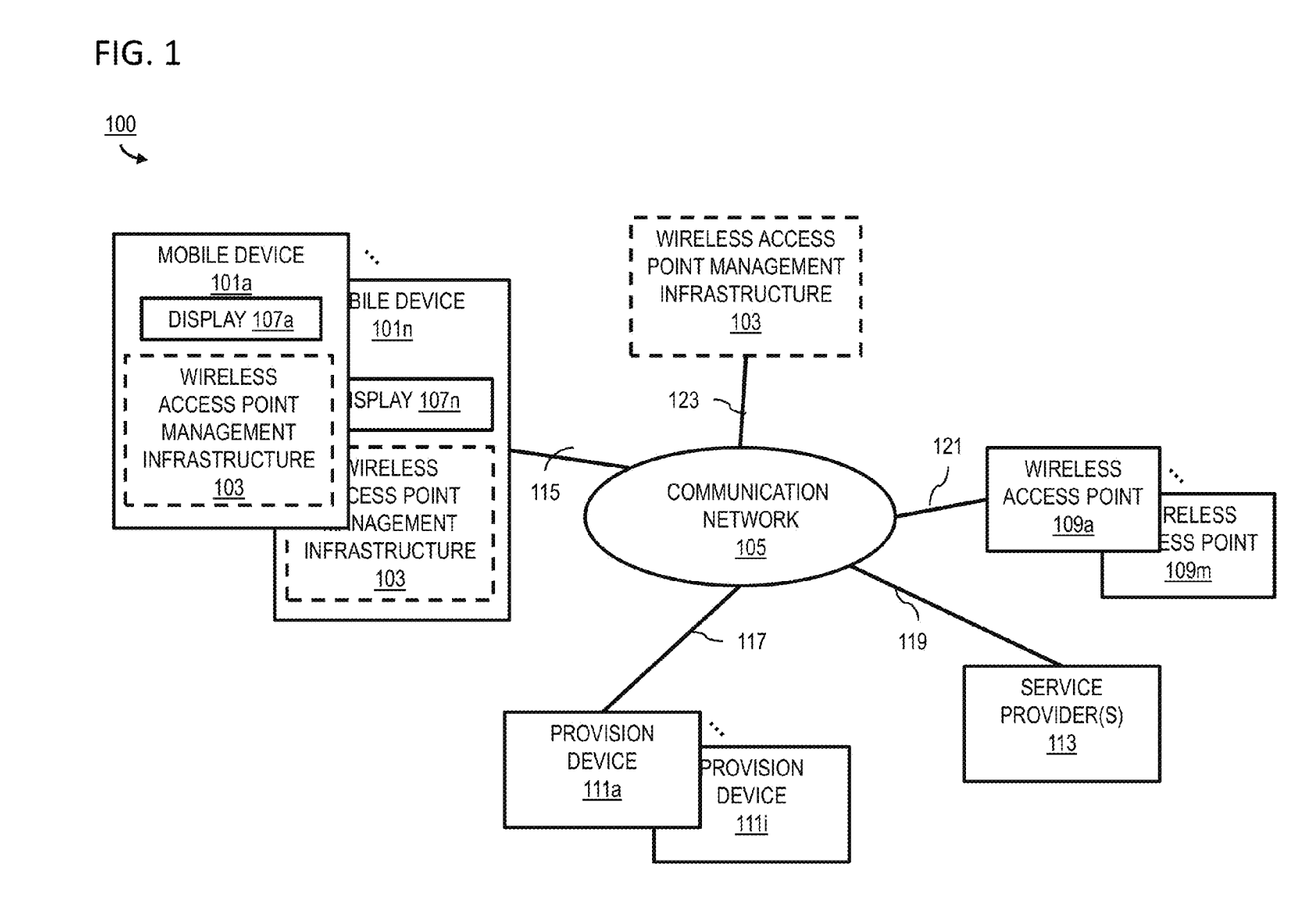
FIG. 1 is a schematic block diagram of a computer network system facilitating wireless access point registration, according to an embodiment.

FIG. 1 is a schematic block diagram of a computer network system facilitating wireless access point registration, according to an embodiment. A computer network system 100 can include one or more mobile devices 101a-101n, an access management infrastructure 103, one or more wireless access points 109a-109m, one or more provision devices 111a-111i, and one or more service provider(s) 113, each of which can be operatively coupled to each other via a communication network 105. Thus, FIG. 1 is merely an example illustrating the types of devices that can be included within a computer network system 100.

Communication network 105 can be any communication network, such as the Internet, configurable to allow the one or more mobile devices 101a-101n, the wireless access point management infrastructure 103, the one or more wireless access points 109a-109m, the one or more provision devices 111a-111i, and the one or more service provider(s) 113 to communicate with communication network 105 and/or with each other through communication network 105. Communication network 105 can be any network or combination of networks capable of transmitting information (e.g., data and/or signals) and can include, for example, a telephone network, an Ethernet network, a fiber-optic network, a cellular network, and/or a wireless network.

In some instances, communication network 105 can include multiple networks operatively coupled to one another by, for example, network bridges, routers, switches and/or gateways. For example, the mobile devices 101a-101n can be operatively coupled to a wireless network; the provision devices 111a-111i, and/or the wireless access point management infrastructure 103 can be operatively coupled to a fiber-optic network, and/or the one or more wireless access points 109a-109m can be operatively coupled to an Ethernet network. The wireless network, fiber-optic network and Ethernet network can each be operatively coupled to one another via one or more network bridges, routers, switches, and/or gateways such that the wireless network, the Ethernet network and the fiber-optic network are operatively coupled to form a communication network. Alternatively, the wireless network, the fiber-optic network and the Ethernet network can each be operatively coupled to one another via one or more additional networks. For example, the wireless network, the fiber-optic network and the Ethernet network can each be operatively coupled to the Internet such that the wireless network, the fiber-optic network, the Ethernet network and the Internet are operatively coupled to form a communication network.

As illustrated in FIG. 1, mobile devices 101a-101n are operatively coupled to communication network 105 via network connections 115; provision devices 111a-111i are operatively coupled to communication network 105 via network connections 117; service provider(s) 113 are operatively coupled to communication network 105 via network connections 119; wireless access points 109a-109m are operatively coupled to communication network 105 via network connections 121; and the wireless access point management infrastructure 103 is operatively coupled to communication network 105 via network connections 123. Network connections 115, 117, 119, 121, and 123 can be any appropriate network connections for operatively coupling mobile devices 101a-101n, wireless access points 109a-109m, provision devices 111a-111i, service provider(s) 113, and the wireless access point management infrastructure 103. Each mobile device 101a-101n, each wireless access point 109a-109m, each provision devices 111a-111i, each service provider 113, and each wireless access point management infrastructure 103 is operatively coupled to communication network 105 via a separate network connection 115, 117, 119, 121, and 123, respectively.

A network connection can be a wireless network connection such as, for example, a wireless fidelity ("Wi-Fi") or wireless local area network ("WLAN") connection, a wireless wide area network ("WWAN") connection, and/or a cellular connection. A network connection can be a wired connection such as, for example, an Ethernet connection, a digital subscription line ("DSL") connection, a broadband coaxial connection, and/or a fiber-optic connection.

As mentioned above, in some instances, a computer network system 100 can include more than one mobile devices 101a-101n, more than one wireless access point management infrastructures 103, more than one wireless access points 109a-109m, more than one provision devices 111a-111i, and more than one service provider(s) 113. A mobile device 101a-101n, a wireless access point management infrastructure 103, a wireless access point 109a-109m, a provision device 111a-111i, and a service provider 113 can be operatively coupled to the communication network 105 by heterogeneous network connections. For example, a first mobile device 101a-101n can be operatively coupled to the communication network 105 by a WWAN network connection, another mobile device 101a-101n can be operatively coupled to the communication network 105 by a DSL network connection, and an wireless access point management infrastructure 103 can be operatively coupled to the communication network 105 by a fiber-optic network connection.

The service provider(s) 113 can be, for example, web servers configured to provide electronic devices, such as mobile devices 101a-101n, web access across the communication network 105. For example, the mobile device 101a-101n can be in communication with the wireless access point management infrastructures 103 via the communication network 105, and a service provider device 113 can facilitate communication between the mobile devices 101a-101n and other electronic devices and/or servers.

The mobile devices 101a-101n can be any of a variety of electronic devices that can be operatively coupled to communication network 105. A mobile device 101a-101n can be a personal computer, a laptop computer, a personal digital assistant (PDA), a Smartphone, a portable/mobile internet device and/or some other electronic communication device. The mobile device 101a-101n can include a web browser configured to access a webpage or website hosted on or accessible via the service provider 113 over communication network 105. The mobile devices 101a-101n can be configured to support, for example, HTML using JavaScript. For example, the mobile device 101a-101n can include a web browser, such as, Internet Explorer, Firefox, Safari, Opera and Chrome. An Internet page or website can be accessed by a user of a mobile device 101a-101n by providing the web browser with a reference such as a uniform resource locator (URL), for example, of a webpage. For example, a user of a mobile device 101a-101n can access a wireless access point management infrastructure 103 via a URL designated for the wireless access point management infrastructure 103. In some instances, mobile devices 101a-101n can include specialized software for accessing a web server other than a browser, such as, for example, a specialized network-enabled mobile application or program. The specialized mobile application can guide a user of a mobile device 101a-101n through entering registration data associated with a wireless access point 109a-109m. An example of guided data entry is discussed with regards to FIG. 4.

In some instances, location information of a mobile device 101a-101n, which can be used as the location information of a collocated wireless access point 109a-109m, can be determined based on the WLAN network location information of the mobile device 101a-101n. The WLAN network location information of the mobile device 101a-101n can be determined based on location information of other active wireless access points 109a-109m that are located in the vicinity of the mobile device and are already provisioned/located in the WLAN network. In some instances, mobile devices 101a-101n can include specialized navigation software such as, for example Global Positioning System (GPS) for recording or storing location of the mobile device 101a-101n to be used to register a wireless access point 109a-109m at a wireless access point management infrastructure 103 or a provision device 111a-111i. In some instances, portions of a website accessible via a web server can be located in a wireless access point management infrastructure 103 accessible to the mobile device 101a-101n. Furthermore, any of the components or devices of computer network system 100 may have access to one or more data stores (not shown). A data store can be at least one of a database, a data warehouse, or a file. A mobile device 101a-101n can also include a display, monitor or User Interface (UI) 107a-107n, a keyboard, various ports (e.g., a USB port), and other user interface features, such as, for example, touch screen controls, audio components, and/or video components (each not shown). A mobile device 101a-101n can be operatively coupled to communication network 105 via the UI 107a-107n and network connection 115.

The wireless access points 109a-109m, in general, provide interface among communication networks 105 or among components or devices of communication networks. For example, wireless access points 109a-109m can map between networks and/or components or devices (e.g., mobile devices 101a-101n, provision devices 111a-111i, wireless access point management infrastructure 103, etc.), forward data between networks and/or components or devices, etc.

The provision devices 111a-111i are compute devices that prepare and equip a communication network 105 (or a service provider 113), and one or more wireless access points 109a-109m. Provision devices 111a-111i allow the communication network (or the service provider) to provide or initiate new, services to the mobile devices 101a-101n via the wireless access points 190a-109m.

Figure 2:
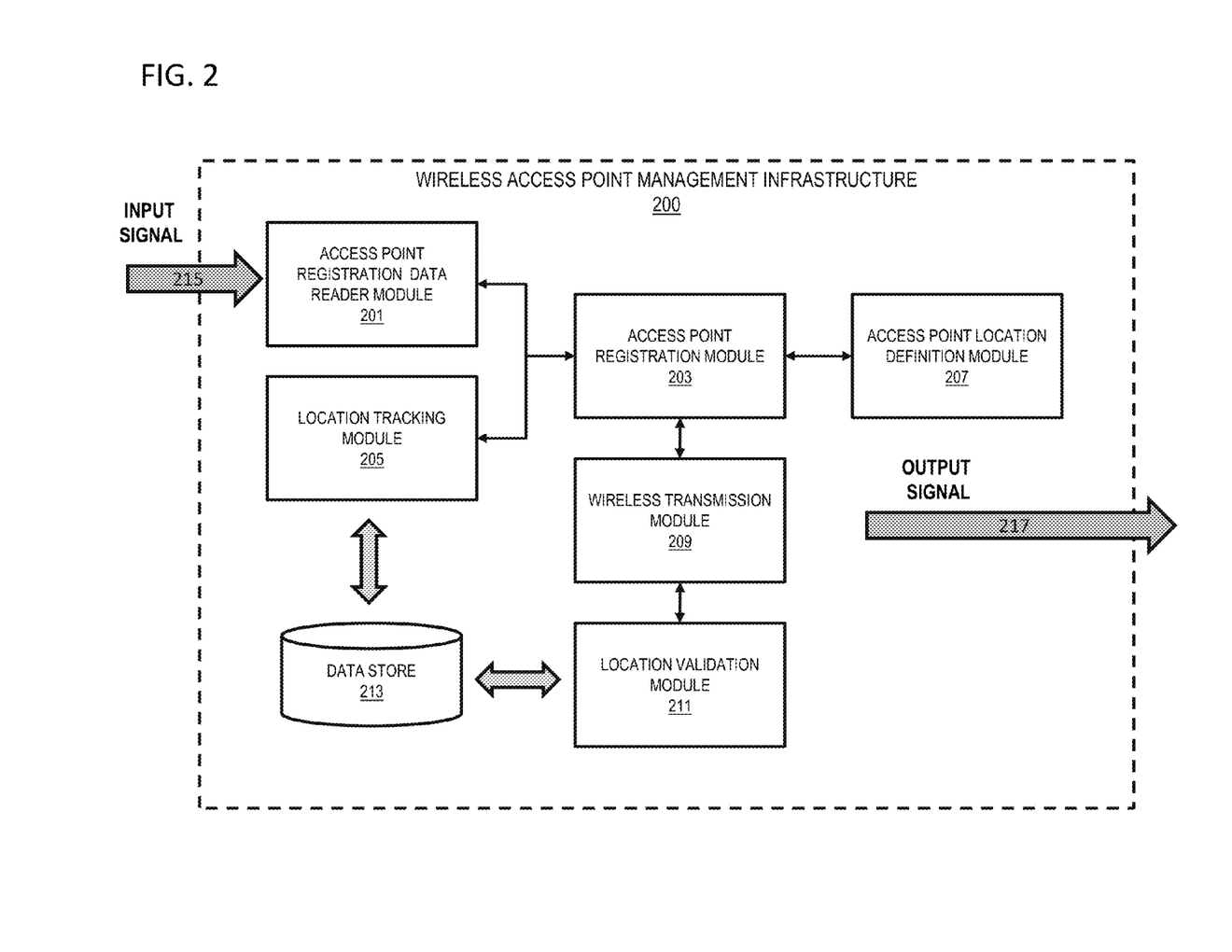
FIG. 2 is a schematic illustration of a wireless access point management infrastructure, according to an embodiment.

FIG. 2 is a schematic illustration of a wireless access point management infrastructure 200, according to an embodiment. The wireless access point management infrastructure 200 can be similar to the wireless access point management infrastructure 103 of FIG. 1. As shown in FIG. 2, an wireless access point management infrastructure 200 includes an access point registration data reader module 201, an access point registration module 203, a location tracking module 205, an access point location definition module 207, a wireless transmission module 209, a location validation module 211, and a data store 213. The data store 213 is a data storage component storing data such as location information or any data that is stored during wireless access point registration process by the wireless access point management infrastructure 200. Furthermore, the wireless access point management infrastructure 200 communicates with other components or devices of a computer network system, such as computer network system 100 of FIG. 1, via input signal 215, and output signal 217.

In various instances, the wireless access point management infrastructure 200 and its components may be located anywhere within a network communication system 105 such as that shown in FIG. 1 including, but not limited to, within the mobile devices 101a-101n, within the provision devices 111a-111i, or in separate locations within the computer network system 100 of FIG. 1.

In some instances, the wireless access point management infrastructure 200 or one or more components 201-211 of the wireless access point management infrastructure 200 can be stored as instructions in a memory of a mobile device 101a-101n, a provision device 111a-111i, a service provider 113, or other devices within the computer network system 100. In such instances the stored instructions can be executed by a processor associated with the mobile device 101a-101n, the provision device 111a-111i, the service provider 113, or other devices.

As used herein, a module can be, for example, any assembly and/or set of operatively-coupled electrical components, and can include, for example, a memory, a processor, electrical traces, optical connectors, software (stored in memory and executing or to be executed in hardware) and/or the like. Furthermore, a module can be capable of performing one or more specific functions associated with the module, as discussed further below.

The access point registration data reader module 201 receives registration data associated with a wireless access point 109a-109m, including, for example, a wireless access point identifier from a mobile device 101a-101n via an input signal 215. For example, a user of a mobile device 101a-101n can enter registration data associated with a wireless access point 109a-109m into the mobile device 101a-101n using a keypad. This registration data is received via an input signal 215 at the access point registration data reader module 201. The access point registration data reader module 201 sends the received registration data to the access point registration module 203. Alternatively, the access point registration data reader module 201 can store the received registration data in data store 213 and send a signal to the access point registration module 203 indicating that a new wireless access point 109a-109m is ready for registration and that the registration data is in data store 213.

In some instances, the mobile device 101a-101n can provide its location information to the wireless access point management infrastructure 200 together with the registration data. Alternatively, upon receiving the wireless access point registration data, the access point registration module 203 requests location information of the mobile device 101a-101n from the location tracking module 205. The location tracking module 205 can send a request to the mobile device 101a-101n via an output signal 217 for location information of the mobile device 101a-101n. Upon receiving the request, the mobile device 101a-101n can send its location information to the wireless access point management infrastructure 200 via a navigation system within the mobile device 101a-101n. Alternatively, a user of the mobile device 101a-101n can receive the location request as a message such as, for example, and Instant Message (IM), a Short Message Service (SMS) message, an email message, etc. The user can send the current location of the mobile device 101a-101n to the wireless access point management infrastructure 200, for example, by simply replying to the received message, typing and sending the reply. The location tracking module 205 can receive the location information from the mobile device 101a-101n via another input signal 215 from a service provider 113 that provides navigation service, messaging service, etc. to the mobile device 101a-101n.

Upon receiving the location information of the mobile device 101a-101n, the location tracking module 205 can store the location information at data store 213 and/or send the location information to the access point registration module 203. Alternatively, the location tracking module 205 can send a signal to the access point registration module 203 indicating that location information of a mobile device 101a-101n associated with the wireless access point 109a-109m has been received and stored at data store 213.

Upon retrieving/receiving the location information of the mobile device 101a-101n, the access point registration module 203 can send a request to the access point location definition module 207 for defining a configuration of the wireless access point 109a-109m based on the registration data for wireless access point 109a-109m, and the location information of the mobile device 101a-101n. The location definition module 207 can receive the registration data of the wireless access point 109a-109m and the location information of the mobile device 101a-101n from the access point registration module 203 or retrieve the registration data and the location information from data store 213. The access point location definition module 207 can, for example, produce a location profile for the wireless access point 109a-109m including the wireless access point identification, wireless access point location, other registration data associated with the wireless access point 109a-109m, etc. The wireless access point location profile can include other information associated with the wireless access point 109a-109m such as, for example, wireless access point type, capabilities, usage logs, etc. The access point location definition module 207 can store the location profile in data store 213 or send the location profile to the access point registration module 203 in response to the request. The access point registration module 203 receives/retrieves the location information associated with the wireless access point 109a-109m from the location profile and sends the location information to a provision device 111a-111i via the wireless transmission module 209 through another output signal 217.

In some instances, prior to sending the request to the access point location definition module 207, the access point registration module 203 can request the wireless transmission module 209 to send the location information and a request to the location validation module 211 such that the location validation module 211 can check the validity of location information. Upon receiving the request, the location validation module 211 can send a validation request to the mobile device 101a-101n via another output signal 217. After receiving a response from the mobile device 101a-101n via another input signal 215, the location validation module 211 can determine whether the initial location information is valid or invalid. If the location is invalid, the location validation module 211 can request valid location information from the mobile device 101a-101n, or from a service provider 113 that provides mobile location information. The location validation module 211 can report the validity status of the location information to the access point registration module 203 via the wireless transmission module 209.

Upon receiving the validity report, if the validity is confirmed, the access point registration module 203 sends a request to the access point location definition module 207 for defining a configuration of the wireless access point 109a-

109*m* based on the registration data and the verified location information. Upon receiving the location information associated with the wireless access point 109*a*-109*m*, the access point registration module 203 sends the location information to the wireless transmission module 209 to be sent to the provision device 111*a*-111*i*. The wireless transmission module 209 sends the location information to the provision device 111*a*-111*i* via another output signal 217 for the wireless access point 109*a*-109*m* to be provisioned. The access point registration module 203 can also store the location information in the location profile of the wireless access point 109*a*-109*m* produced by the access point location definition module 207 (e.g., in data store 213). The provision device 111*a*-111*i* can automatically provision the wireless access point 109*a*-109*m* upon receiving the signal having the location profile of the wireless access point 109*a*-109*m*.

Examples of the processes of facilitating wireless access point registration by the wireless access point management infrastructure 200 within the computer network system 100 are further described below in connection with FIGS. 3 and 4.

Figure 3:
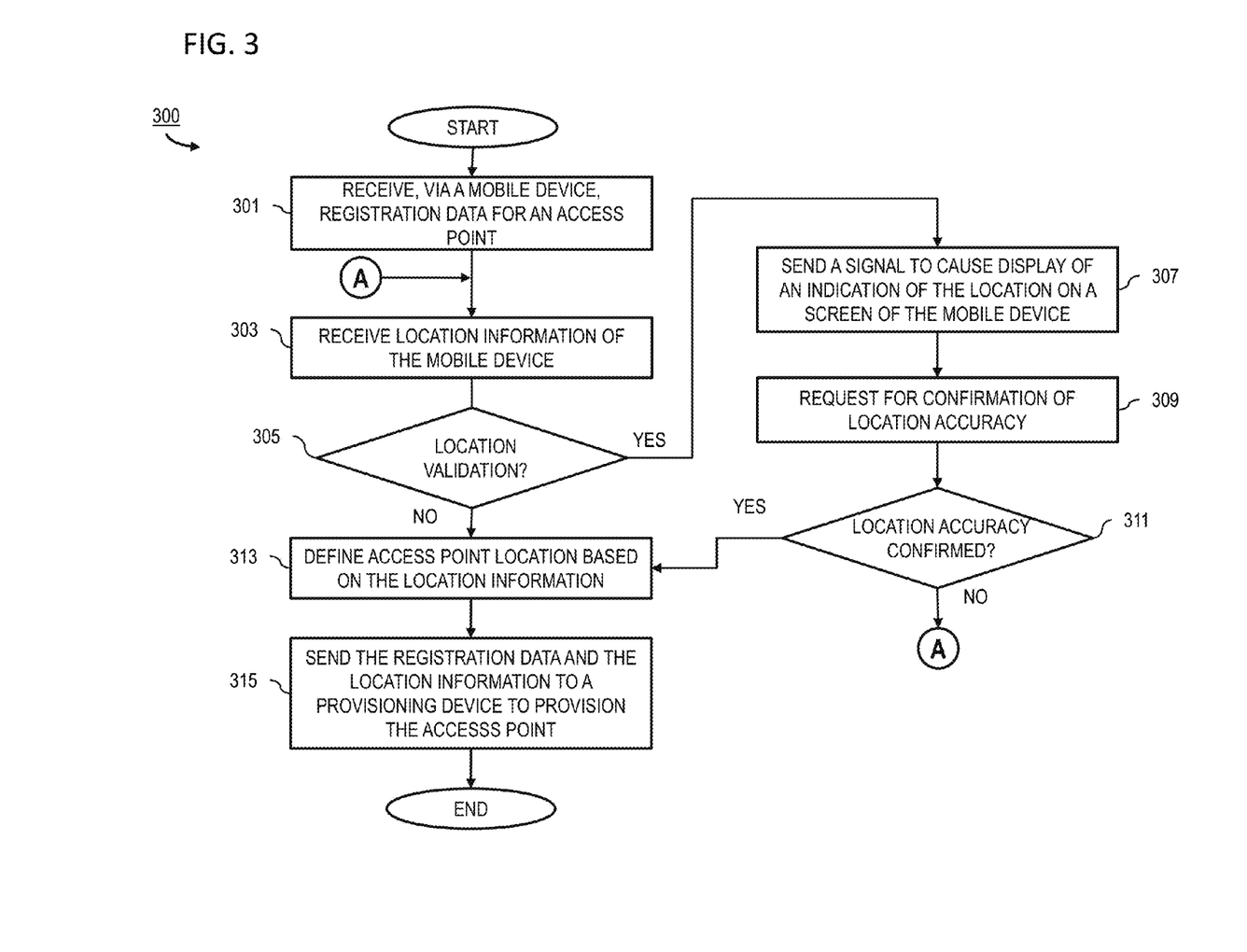
FIG. 3 is a flowchart of a process for facilitating wireless access point registration, according to an embodiment.

FIG. 3 is a flowchart of a process for facilitating wireless access point registration, according to an embodiment. As shown in FIG. 3, at 301, the wireless access point management infrastructure 200 of FIG. 2 receives, via input signal 215 from a mobile device 101*a*-101*n*, registration data for a wireless access point 109*a*-109*m*. The registration data of a wireless access point 109*a*-109*m* can include data such as, for example, a media access control address associated with the wireless access point 109*a*-109*m*, a serial number of the wireless access point 109*a*-109*m*, etc. The registration data can be retrieved or obtained by a user of the mobile device 101*a*-101*n* by simply typing the information into the mobile device 101*a*-101*n* using a key pad, by taking a photo from a data panel on the wireless access point 109*a*-109*m*, etc.

In some instances, the registration data may include optical barcode information representative of the registration data. In such instances the optical barcode data is read by an access point registration data reader module 201, for example, by scanning the barcode. In some other instances the registration data can includes a radio frequency identification signal representative of the registration data. In such instances the access point registration data reader module 201 may be equipped with a radio frequency reader to read the registration data. In some instances, the registration data may be encrypted for security reasons. In such instances, the registration data may include a private cryptographic key such that the registration data can be decrypted by the access point registration module 203 using previously stored cryptographic information associated with the private cryptographic key.

The mobile device 101*a*-101*n* can send the registration data to the wireless access point management infrastructure 200, for example, via a message (IM, SMS, email, etc.). Upon receiving the wireless access point registration data, the wireless access point management infrastructure 200 stores the registration data at data store 213 and requests location information of the mobile device 101*a*-101*n*, to be used for determining location of the wireless access point 109*a*-109*m*. Alternatively, the mobile device 101*a*-101*n* may report its location to the wireless access point management infrastructure 200. At 303, the wireless access point management infrastructure 200 receives location information of mobile device 101*a*-101*n*.

In some instances, the access point registration module 203 and the location tracking module 205 can have access to a global position satellite (GPS) module (not shown). In such instances, the access point registration module 203 can receive mobile device 101*a*-101*n* location information including the global positioning satellite (GPS) coordinates. Alternatively/additionally, the mobile device 101*a*-101*n* location information can include map data, textual street address, or a combination thereof. The mobile device 101*a*-101*n* location information can also be determined by the wireless access point management infrastructure 200 based on other techniques such as, for example, wireless local area network triangulation, which uses measurement of the Received Signal Strength Indication (RSSI) signal strength received from the mobile device 101*a*-101*n*; mobile device tracking, using cellular network location information; etc. In some instances, upon receiving location information from the mobile device 101*a*-101*n*, the location tracking module 205 can track the mobile device 101*a*-101*n* using the cellular network location information to verify the location information received from the mobile device 101*a*-101*n*, based on a request from the location validation module 211.

In some instances, prior to wireless access point registration, the wireless access point management infrastructure 200 checks accuracy of the location information received from mobile device 101*a*-101*n* (at 305). In such instances, at 307, the location validation module 211 sends, via output signal 217, a signal to cause display, on a UI 107*a*-107*n* of the mobile device 101*a*-101*n*, of an indication of the location of the mobile device 101*a*-101*n* relative to a map of the area. At 309, the location validation module 211 sends a validation request to the mobile device 101*a*-101*n* for a confirmation message indicative of the location being accurate. For example, a user of the mobile device 101*a*-101*n* may have entered a wrong address as the location information with a typo. The user can edit the entry after receiving the validation request. The validation request may be sent as an IM, SMS, email, etc. via an output signal 217. For example, the validation request can be displayed on the map that is displayed on UI 107*a*-107*n* at 307.

Upon receiving a response from the UE 101*a*-101*n* via input signal 215, at 311, the location validation module 211 verifies the response. If the response from the mobile device 101*a*-101*n* indicates that the location information is not accurate, the location validation module 211 sends a signal to the access point registration module 203 requesting new location information. Upon receiving the request, the access point registration module 203 repeats the process of flowchart 300 by requesting location information from mobile device 101*a*-101*n*, at 303. Alternatively, if at 311 the location accuracy is confirmed, the location validation module 211 sends a signal to the access point registration module 203 indicating validity of the location information. Upon receiving location information validity approval, the access point registration module 203 sends the mobile device 101*a*-101*n* location information to the access point location definition module 207. Furthermore, the location validation module 211 can send a signal to the location tracking module 205 to request tracking of the mobile device 101*a*-101*n* location using the cellular network location information to verify the location information received from the mobile device 101*a*-101*n*.

Returning to step 305, in some instances where location information validity verification is not needed by the wireless access point management infrastructure 200, for example the location information is received from a trusted source, the location information is already validated through prior registration processes, etc., the access point registration module 203 sends the mobile device 101*a*-101*n* location information to the access point location definition module 207 and the process of flowchart 300 continues at step 311 (steps 307 to 311 are bypassed).

At 313, the access point location definition module 207 defines location information of the wireless access point 109a-109m, for example, by producing a location profile for the wireless access point 109a-109m containing the location information and sending the location profile to the access point registration module 203 or storing the location profile in data store 213. Upon receiving the location information (e.g., extracting the location information from the location profile), the access point registration module 203 collects the location information and the registration data associated with the wireless access point 109a-109m (e.g., retrieving the registration data and location information from data store 213, or receiving the registration data from the access point registration data reader module 201 and receiving the location information from the access point location definition module 207 via a location profile, etc.). At 315, the wireless access point management infrastructure 200 sends an electronic message including the registration data and location information of the wireless access point 109a-109m to a provision device 111a-111i, via an output signal 217, such that the provision device 111a-111i can provision the wireless access point 109a-109m. The electronic message or signal sent to the provision device 111a-111i from the wireless access point management infrastructure 200 includes, for example, an electronic mail message. The message may also include one or more Instant Messages (IMs), Short Message Service (SMS) messages, etc.

In some instances, the wireless access point 109a-109m is configured to provide access to a wireless network in an area. In such instances, the wireless access point management infrastructure 200 can send a signal, via output 217, to the mobile device 101a-101n to cause display, on a UI 107a-107n of the mobile device 101a-101n, of an indication of the location of the mobile device 101a-101n relative to a map of the area.

In some instances, upon completion of a wireless access point provisioning by a provision device 111a-111i, the wireless access point 109a-109m can send a signal to the wireless access point management infrastructure 200 including a message indicating that the wireless access point 109a-109m is provisioned. Upon receiving the message the wireless access point management infrastructure 200 can send a message to service provider(s) 113 indicating that the wireless access point 109a-109m is provisioned and can be put to service.

Figure 4:
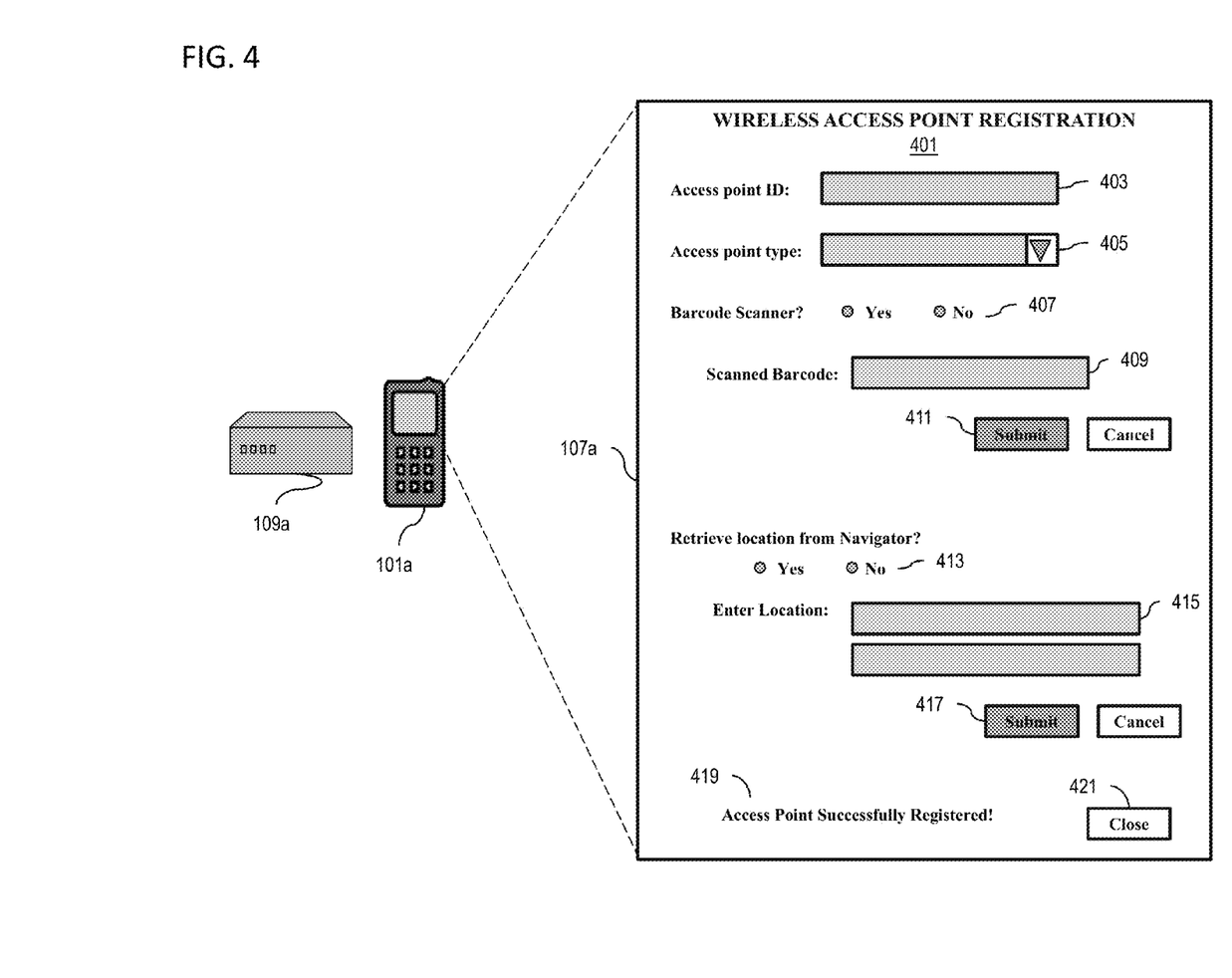
FIG. 4 is a sample display on a mobile device related to facilitating wireless access point registration, according to an embodiment.

FIG. 4 is a sample display on a mobile device 101a related to facilitating wireless access point registration, according to an embodiment. FIG. 4 shows a mobile device 101a, and a wireless access point 109a as described with regards to FIGS. 1, 2, and 3. In the example of FIG. 4, the mobile device 101a is located in the vicinity of the wireless access point 109a; a user of mobile 101a would like to register the wireless access point 109a at a provision device 111a-111i of FIG. 1, via a wireless access point management infrastructure 200 of FIG. 2.

In the example of FIG. 4, the user of mobile device 101a can access a URL or execute code associated with the wireless access point management infrastructure 200 on the mobile device 101a, for example a mobile application, to cause the wireless access point registration window 401 to be displayed on UI 107a. The code to cause the display can be provided by the wireless access point management infrastructure 200. In some instances, the user of mobile device 101a may access a data entry window such as window 401 on a website associated with the wireless access point management infrastructure 200, via the Internet.

In some instances, prior to the display of window 401 on UI 107a of mobile device 101a, the wireless access point management infrastructure 200 can request the user of mobile device 101a to provide an identification code or a password and verify user authorization for registering an wireless access point 109a.

The user can enter an ID or a serial number associated with the wireless access point 109a in window 403. The serial number can be found on the wireless access point 109a, in an instructions manual accompanying the wireless access point 109a, etc. The user may also select the type of wireless access point 109a (e.g., manufacturer, model, etc.) from a drop down menu 405.

Alternatively/additionally, the wireless access point 109a may have an optical barcode representative of registration data. If the mobile device 101a is equipped with an optical barcode reader, the user can answer "Yes" to question 407; otherwise the user may select "No". Upon receiving the answer, the wireless access point management infrastructure 200 may prompt user to hold the scanner close to the barcode (prompt not shown) of the wireless access point 109a. The mobile device 101a can read the registration data from the barcode of the wireless access point 109a. The registration data can be displayed in window 409. The user of the mobile device 101a may also take a photo from a data panel on the wireless access point 109a that includes registration data, with a camera on the mobile device 101a (camera not shown). The user can store the registration data at a local memory (not shown) on the mobile device 101a. Subsequently, the user can send the registration data to the wireless access point management infrastructure 200, by selecting a "Submit" button 411.

As previously discussed with regards to FIG. 3, the wireless access point management infrastructure 200 receives the registration data, stores the registration data in data store 213 and requests for location information of the mobile device 101a. The request for location information of the mobile device 101a is sent to the mobile device 101a via an output signal 217 of the wireless access point management infrastructure 200. The request may be represented to the user of mobile device 101a as a message (IM, SMS, email, etc.) on a UI 107a of the mobile device 101a. Upon receiving the request for location information of the mobile device 101a via UI 107a of the mobile device 101a, the use of mobile device 101a can either select "Yes" on line 413 to authorize the location tracking module 205 of the wireless access point management infrastructure 200 to retrieve the location information of the mobile device 101a from a global positioning system (GPS). Alternatively, the user can select "No" on line 413, and enter location information in windows 415 and select the "Submit" button 417 to send the location information to the wireless access point management infrastructure 200.

In some instances, once the wireless access point registration process for wireless access point 109a is successfully completed and the wireless access point management infrastructure 200 has performed the process of flowchart 300 of FIG. 3 at least up to step 313, the access point registration module 203 can send a message to mobile device 101a as an IM, SMS, or an email message (shown as window 419) to inform the user that the registration data and the location information provided by the user have been received, are accepted and validated (the validation discussed with regards to FIG. 3 but not shown in FIG. 4). The user can end the communication of mobile device 101a with the wireless access point management infrastructure 200 by selecting the "close" button 421.

It is intended that the systems and methods described herein can be performed by software (stored in memory and/ or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to devices (e.g., wireless access points, mobile communication devices) with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A method, comprising:
    receiving, via a mobile device different from a wireless access point, registration data for the wireless access point, the mobile device having a location represented by mobile device location information;
    defining, at the mobile device, wireless access point location information based on the mobile device location information; and
    sending, to a provision device, a message including (1) the registration data, and (2) the wireless access point location information such that the provision device provisions the wireless access point.

2. The method of claim 1, wherein receiving the registration data includes receiving optical barcode information representative of the registration data.

3. The method of claim 1, wherein receiving the registration data includes receiving a radio frequency identification signal representative of the registration data.

4. The method claim 1, wherein at least one of the mobile device location information or the wireless access point location information includes global positioning satellite coordinates.

5. The method of claim 1, wherein at least one of the mobile device location information or the wireless access point location information includes a wireless local area network location of the mobile device.

6. The method of claim 1, wherein the wireless access point is configured to provide access to a wireless network in an area, the method further including sending a signal to cause display, on a screen of the mobile device, of an indication of a location of the mobile device relative to a map of the area.

7. The method of claim 1, wherein the registration data includes a media access control address associated with the wireless access point.

8. The method of claim 1, wherein the message includes an electronic mail message.

9. The method of claim 1, further comprising receiving the mobile device location information in response to receiving the registration data.

10. A non-transitory processor-readable medium storing code representing instructions to be executed by a processor, the code comprising code to:
    receive a command to capture registration data of a wireless access point;
    store, in response to the command, location information indicative of a location of a mobile device that is different than the wireless access point; and
    send, to a compute device, a message that (1) includes the registration data of the wireless access point, and (2) associates the location information of the mobile device with the wireless access point, the message configured to prompt the compute device to provision the wireless access point such that the wireless access point can provide access to a network.

11. The non-transitory processor-readable medium of claim 10, wherein the code to receive the command to capture registration data includes code to receive a command to scan an optical code representative of the registration data.

12. The non-transitory processor-readable medium of claim 10, wherein the location information is based on wireless local area network triangulation.

13. The non-transitory processor-readable medium of claim 10, wherein the location information is based on cellular network location information.

14. The non-transitory processor-readable medium of claim 10, wherein the registration data includes a serial number.

15. The non-transitory processor-readable medium of claim 10, the code further comprising code to:
    display, on a screen of the mobile device, (1) a map displaying the location of the mobile device, and (2) a request for a confirmation message indicative of the location being accurate; and
    send, to the compute device, the message in response to receipt of the confirmation message.

16. The non-transitory processor-readable medium of claim 10, wherein the message includes an instant message.

17. An apparatus, comprising:

an access point registration module configured to be operatively coupled to a (1) a registration data reader, (2) a location tracking module, and (3) wireless transmission module, the access point registration module configured to receive registration data of a wireless access point from the registration data reader, the access point registration module configured to request location information of a mobile device, different from the wireless access point, from the location tracking module in response to receiving the registration data, the access point registration module configured to send a message, via the wireless transmission module to a provision device, such that the wireless access point is provisioned by the provision device based on the registration data of the wireless access point and the location information of the mobile device.

18. The apparatus of claim 17, wherein the access point registration module is configured to receive the location information from the location tracking module in response to receiving user-provided location information.

19. The apparatus of claim 17, wherein the registration data includes a private cryptographic key.

20. The apparatus of claim 17, wherein the access point registration module is operatively coupled to the location tracking module that is operatively coupled to a global position satellite module.

21. The apparatus of claim 17, wherein the access point registration module is operatively coupled to the registration data reader that is operatively coupled to a barcode scanner.

22. The apparatus of claim 17, wherein the access point registration module is configured to receive, via the wireless access point, a message indicating that the wireless access point was provisioned.

* * * * *